United States Patent [19]

Boncan et al.

[11] Patent Number: 4,632,186

[45] Date of Patent: Dec. 30, 1986

[54] WELL CEMENTING METHOD USING AN AM/AMPS FLUID LOSS ADDITIVE BLEND

[75] Inventors: Virgilio G. Boncan; Richard Gandy, both of Spring, Tex.

[73] Assignee: Hughes Tool Company, Houston, Tex.

[21] Appl. No.: 814,350

[22] Filed: Dec. 27, 1985

[51] Int. Cl.[4] ............................................... E21B 33/14
[52] U.S. Cl. ...................................... 166/293; 106/90; 523/130
[58] Field of Search ....................... 166/293, 292, 283; 106/90, 93; 523/130

[56] References Cited

U.S. PATENT DOCUMENTS 4,015,991 4/1977 Persinski et al. ...................... 106/90
4,258,790 3/1981 Hale ...................................... 166/293

OTHER PUBLICATIONS

McKenzie et al., "Acrylamide/Acrylic Acid Copolymers for Cement Fluid Loss Control", SPE paper No. 10623, Society of Petroleum Engineers of AIME, Jan. 25-27, 1982.

Primary Examiner—Stephen J. Novosad
Attorney, Agent, or Firm—Charles D. Gunter, Jr.

[57] ABSTRACT

An additive blend for a well cementing composition is shown which comprises a copolymer of acrylamide and 2-acrylamido-2-methylpropane sulfonate, the sodium salt of naphthalene formaldehyde sulfonate, and polyvinylpyrrolidone polymer. The fluid loss additive is mixed together with a hydraulic cement and water in an amount to produce a pumpable slurry. The cement slurry is pumped to the desired location in the wellbore and allowed to harden to a solid mass.

4 Claims, No Drawings

WELL CEMENTING METHOD USING AN AM/AMPS FLUID LOSS ADDITIVE BLEND

BACKGROUND OF THE INVENTION

1. Field of the Invention

This invention relates generally to oil and gas well cementing compositions and specifically to polymeric fluid loss additives for such compositions and methods of making the same for controlling fluid loss during cementing operations without retarding the cement.

2. Description of the Prior Art

Cement compositions are used in the oil and gas industry to cement the annular space in the wellbore between the surrounding formation and the pipe or casing. Typically the cement slurry is pumped down the inside of the casing and back up the outside of the casing through the annular space. The amount of water which is used in forming the cement slurry will vary depending upon the type of hydraulic cement selected and the job conditions at hand. The amount of water used can vary over a wide range, depending upon such factors as the required consistency of the slurry and upon the strength requirement for a particular job. Many times, the hydraulic cement must be placed within or next to a porous medium, for example earthern strata in the wellbore. When this happens, water tends to filter out of the slurry and into the strata during placement and setting of the cement. Many difficulties are related to an uncontrolled fluid loss of this type such as an uncontrolled setting rate, improper placement of the slurry, impaired strength properties, and a contamination of the surrounding strata. These conditions are all undesirable in oil and gas well cementing operations.

In order to lessen the fluid loss from the aqueous cement slurry, various materials have been employed in the past. One such material was a copolymer of an acrylamide and acrylic acid. This fluid loss material has the ability to maintain fluid loss control over a wide temperature range, functioned well in the presence of salts, and was superior to cellulose base additives when chloride salt accelerators were present. In spite of these advantages, the copolymer of acrylamide and acrylic acid exhibited latent retarding effects, thereby lessening the usefulness of the material in cement compositions used in low temperature environments.

The object of the present invention is to provide a low fluid loss additive blend for a cement composition which is non-retarding and thus useful in cement compositions at lower temperatures.

SUMMARY OF THE INVENTION

It has now been discovered that a novel fluid loss additive blend can be provided for a well cementing composition which has the advantages of an acrylamide/acrylic acid fluid loss additive but which is non-retarding at lower temperatures. The additive blend comprises a copolymer of acrylamide and 2-acrylamido-2-methylpropane sulfonate, the sodium salt of naphthalene formaldehyde sulfonate and polyvinylpyrrolidone polymer. The additive blend is preferably present in a cementing composition in the range from about 0.1 to 2.0 weight percent based upon the weight of dry cement and the relative proportion of the copolymer to sodium salt of naphthalene formaldehyde sulfonate to polyvinylpyrrolidone in the additive blend is preferably about 3:3:1.

In the method of cementing a wellbore using the additive blend of the invention, a slurry is first prepared by mixing hydraulic cement, water in an amount to produce a pumpable slurry, and the non-retarding fluid loss additive blend. The cement slurry is then pumped to the desired location in the wellbore and allowed to harden to a solid mass.

Additional objects, features and advantages will be apparent in the written description which follows.

DETAILED DESCRIPTION OF THE INVENTION

The term "hydraulic cement" is meant to encompass any organic cement that hardens or sets under water. Hydraulic cements, for example, include Portland cements, aluminous and Pozzolan cements, and the like. The term "hydraulic cement" is also intended to include cements having minor amounts of extenders, such as bentonite, and sodium silicate, and also is intended to include cements used either without any appreciable sand or aggregate material, or such cements admixed with a granular filling material such as sand, ground limestone, and the like. Thus, for example, any of the class "A to H" cements as listed in the "API Spec 10, Second Edition, June 1984" are suitable for this purpose. The strength enhancers such as silica powder can also be employed.

Mixing water is utilized with the dry cement compositions to produce a fluid pumpable slurry of suitable consistency. "API Spec 10, Second Edition, June 1984" which is known in the cement industry, describes an approved apparatus and a method for measuring the consistency of cement slurries in terms of Bearden units of consistency (Bc). A pumpable slurry should measure in the range from about 2–20 Bc and preferably be in the range of 5 to 11 Bc. Slurries thinner than about 5 Bc will tend to have greater particle settling and free water generation. Slurries thicker than about 11 Bc become increasingly difficult to mix and pump.

Depending upon the particular slurry and intended conditions of use, mixing water is utilized in the slurry of the present invention in the range from about 30 to 150 weight percent based upon the dry weight of cement and preferably is in the range of about 35 to 90 weight percent, most preferably about 40 to 50 weight percent.

The present cement compositions, in addition to hydraulic cement and water in a sufficient amount to produce a pumpable slurry, include a dry additive blend. The dry additive blend has three components, the first of which is a polymeric fluid loss additive. The preferred polymeric fluid loss additive is a copolymer of acrylamide and 2-acrylamido-2-methylpropane sulfonate, which will be referred to as AM/AMPS. The copolymer fluid loss additive of the invention is comprised of from about 10 to about 90 mole percent unhydrolyzed acrylamide, and from about 90 to about 10 mole percent 2-acrylamido-2-methylpropane sulfonate. Preferably, the AMPS portion of the copolymer is 24 weight % and the copolymer is characterized by a viscosity of 12–20 cps, a bulk density of 30–38 pounds/cu. ft., and a moisture content of less than 5% by weight. The copolymer can be purchased commercially from Calgon Corporation of Pittsburgh, Pa. Copolymers of the above type are also described in U.S. Pat. No. 4,015,991, issued Apr. 5, 1977, to Persinski et al., the disclosure of which is hereby incorporated by reference.

The second component of the dry additive blend of the invention is the sodium salt of naphthalene sulfonate condensed with formaldehyde, sometimes referred to as a "dispersant" material. The preferred sodium salt of naphthalene sulfonate condensed with formaldehyde has an average molecular weight of about 1500. A satisfactory sodium salt of naphthalene sulfonate for use in the additive blend of the invention can be obtained commercially from The Western Company of North America under the trademark TF-4 from W. R. Grace and Company under the trademark Daxad 19, and from Diamond Shamrock Corporation under the trademark Lomar D.

The third component of the additive blend of the invention is polyvinylpyrrolidone polymer. This material is a polyamide, white, free-flowing powder that is dispersible in water. The polyvinylpyrrolidone selected for use in the present invention will preferably have an average molecular weight of about 40,000. A satisfactory polyvinylpyrrolidone is commercially available under the trade name PVP K-30 from GAF, General Analine and Film Corporation.

The additive blend of the invention is preferably present in the well cementing composition in the range from about 0.1 to 2.0 weight percent of additive blend, based upon the weight of dry cement. Most preferably, the additive blend is present in the range from about 0.6 to 0.7 weight percent, based upon the weight of dry cement. The relative proportion of copolymer to sodium salt of naphthalene formaldehyde sulfonate to polyvinylpyrrolidone in the additive blend is approximately 3:3:1.

In the method of cementing a wellbore using the additive blend of the invention, a cement slurry is first prepared by mixing together a hydraulic cement, water in an amount to produce a pumpable slurry, and the additive blend of the invention. The cement slurry is then pumped to the desired location in the wellbore and allowed to harden to a solid mass.

The following examples are intended to be illustrative of the invention:

EXAMPLE I

An additive blend containing AM/AMPS, the sodium salt of naphthalene formaldehyde sulfonate and polyvinylpyrrolidone in a weight ratio of approximately 1:1:1 was prepared and added to a number of exemplary cement slurries formed using class H cement and water. The consistency, fluid loss, thickening time and compressive strength tests were performed in accordance with the standard procedures contained in the "API Spec 10, Second Edition, June 1984" which is incorporated herein by reference. The exemplary cement slurries were compared to cement slurries containing acrylamide/acrylic acid fluid loss additives and to slurries containing cellulose fluid loss additives. The results are shown in the following table.

The following abbreviations are used in the tables:

| Abbreviation | Meaning |
|---|---|
| NRFL | Non-Retarding Fluid Loss Additive Blend of the Invention |
| AM/AA | Copolymer of Acrylamide and Acrylic Acid |
| HEC | Cellulosic Fluid Loss Additive Blend |
| DD | Sodium Salt of Naphthalene Formaldehyde Sulfonate |
| PVP | Polyvinylpyrrolidone Polymer |

TABLE I

ALL MIXES ARE 1:0:0 (CEMENT) + FRESH WATER
ALL PERCENTAGES ARE BY WEIGHT OF CEMENT

| Cement Class | % Water Fresh | % By Weight of Cmt. | | | Thickening Time (Hrs.) at given Temperature (°F.) | | | | | Temp. (°F.) | Consistency Start/Finish (BC) | API F.L. cc/30 Min. |
|---|---|---|---|---|---|---|---|---|---|---|---|---|
| | | AM/AA | HEC | NRFL | 80 | 100 | 120 | 140 | 160 | | | |
| H | 40 | — | — | — | — | 5:06 | — | — | — | — | — | — |
| H | 40 | 0.7 | — | — | 6:13 | 3:52 | — | 5:34 | — | 120 | 6/7 | 72 |
| H | 40 | — | 0.6 | — | — | — | — | — | — | 120 | 6/14 | 348 |
| H | 40 | — | — | 0.6 | 3:58 | — | — | — | — | 80 | 5/8 | 122 |
| H | 40 | — | — | 0.6 | — | 2:45 | — | — | — | 100 | 5/7 | 126 |
| H | 40 | — | — | 0.6 | — | — | 1:55 | — | — | 120 | 4/5 | 78 |
| H | 40 | — | — | 0.6 | — | — | — | 1:51 | — | 140 | 5/6 | 107 |
| H | 40 | — | — | 0.6 | — | — | — | — | 1:20 | 160 | 5/8 | 11 |
| C | 56 | | | 1.0 | | | 3:32 | | | 120 | 3/6 | 130 |
| A | 46 | | | 0.9 | | | | | | 120 | 7/11 | 129 |
| TLW | 65 | | | 1.3 | | | | | | 120 | 8/7 | 114 |
| G | 44 | | | 0.6 | 5:51 | | 1:43 | | | 120 | 5/8 | 98 |

EXAMPLE II

Exemplary cement slurries were then prepared using the fluid loss additive blend of the invention with the components AM/AMPS, DD, and PVP present in the weight ratio of approximately 3:3:1 and with class H cement from various suppliers. Consistency, fluid loss and thickening time tests were performed as before. The results are shown in Table II.

TABLE II

ALL MIXES ARE 1:0:0 CLASS H CEMENT + FRESH WATER

| Cement Brand | % Water Fresh | % AM/AMPS | % DD | % PVP | Thickening Time (Hrs.) 118° | Temp. (°F.) | Consistency Start/Finish | API FL cc/30 Min. |
|---|---|---|---|---|---|---|---|---|
| Centex | 40 | 0.3 | 0.3 | 0.1 | 2:53 | 118 | 3/6 | 68 |
| Trinity | 40 | 0.3 | 0.3 | 0.05 | — | 118 | 8/11 | 205 |
| Trinity | 40 | 0.3 | 0.3 | 0.1 | — | 118 | 6/9 | 76 |
| El Toro | 40 | 0.3 | 0.3 | 0.05 | — | 118 | 6/9 | 196 |
| El Toro | 40 | 0.3 | 0.3 | 0.1 | 4:59 | 118 | 8/9 | 163 |

TABLE II-continued

ALL MIXES ARE 1:0:0 CLASS H CEMENT + FRESH WATER

| Cement Brand | % Water Fresh | % AM/AMPS | % DD | % PVP | Thickening Time (Hrs.) 118° | Temp. (°F.) | Consistency Start/Finish | API FL cc/30 Min. |
|---|---|---|---|---|---|---|---|---|
| Nevada | 40 | 0.3 | 0.3 | 0.05 | — | 118 | 7/10 | 110 |
| Nevada | 40 | 0.3 | 0.3 | 0.1 | 1:20 | 118 | 4/7 | 56 |
| Texas | 40 | 0.3 | 0.3 | 0.05 | — | 118 | 4/7 | 136 |
| Texas | 40 | 0.3 | 0.3 | 0.1 | 1:30 | 118 | 4/5 | 50 |

TABLE III

| Cement (Classes) | % H₂O (Fresh) | % Add. by Cmt. NRFL | % Add. by Cmt. CaCl | % Add. by H₂O NaCL | % Add. by H₂O KCL | Consistency (BC) Start/Finish at 120° F. | Fluid Loss (cc/30 min.) | 80° F. Comp. Strength (psi) 12 hrs. | 80° F. Comp. Strength (psi) 24 hrs. |
|---|---|---|---|---|---|---|---|---|---|
| H | 40 | 0.8 | 2.0 | | | 7/16 | 110 | | |
| H | 40 | 0.8 | 1.0 | | | 3/8 | 163 | 1038 | 2528 |
| H | 43.60 | 1.5 | | 18.0 | | 10/12 | 132 | 5 | 688 |
| H | 40 | 0.9 | | | 3.0 | 6/7 | 60 | 238 | 2450 |
| H | 40 (SEA) | 0.9 | | | | 5/7 | 70 | 688 | 2675 |
| G | 44 | 1.6 | | 18.0 | | 10/12 | 44 | 58 | 500 |
| G | 44 | 1.0 | | | 3.0 | 6/7 | 85 | 268 | 1150 |

TABLE IV

| Cement Class | % H₂O (Fresh) | % Additive by Cement NRFL | % Additive by Cement Bentonite | % Additive by Cement Na | °F. | Consistency (BC) Start/Finish | Fluid Loss (cc/30 min.) | 80° F. Comp. Strength (psi) 12 hrs. | 80° F. Comp. Strength (psi) 24 hrs. |
|---|---|---|---|---|---|---|---|---|---|
| H | 109.6 | 1.5 | 12.0 | | 120 | 8/7 | 108 | 10 | 160 |
| H | 105.0 | 2.0 | | 2.0 | 120 | 5/7 | 122 | 298 | 765 |
| G | 105 | 2.0 | | 2.0 | 120 | 6/7 | 116 | 120 | 350 |
| G | 107.6 | 1.5 | 12.0 | | 120 | 5/5 | 88 | 10 | 105 |

As shown in Tables I and II, the cement compositions containing the fluid loss additive of the invention exhibit superior fluid loss characteristics over a wide temperature range. The fluid loss additive does not unduly retard the cement composition at lower temperatures. The weight ratio of approximately 0.3% by weight AM/AMPS, 0.3% by weight DD, and 0.1% by weight PVP provided the most consistent fluid loss when used with cements from a variety of suppliers. The fluid loss blends of the invention function well in the presence of salts (see Table III), and are superior to cellulose base additives when chloride salt accelerators are present. Various cement extenders can also be used with the fluid loss blends of the invention, as shown in Table IV.

While the invention has been shown in only one of its forms, it is not thus limited but is susceptible to various changes and modifications without departing from the spirit thereof.

We claim:

1. A method of cementing a wellbore, comprising the steps of:
   mixing together a hydraulic cement, water in an amount to produce a pumpable slurry, and a non-retarding fluid loss additive blend which comprises a copolymer of acrylamide and 2-acrylamido-2-methylpropane sulfonate, the sodium salt of naphthalene formaldehyde sulfonate, and polyvinylpyrrolidone polymer;
   pumping said cement slurry to the desired location in said wellbore; and
   allowing said cement slurry to harden to a solid mass.

2. A method of cementing a wellbore, comprising the steps of:
   mixing together a hydraulic cement, from about 35 to 90 weight percent water, and from about 0.1 to 2.0 weight percent of a non-retarding fluid loss additive blend which comprises a copolymer of acrylamide and 2-acrylamido-2-methylpropane sulfonate, the sodium salt of naphthalene formaldehyde sulfonate, and polyvinylpyrrolidone polymer, all weight percents being based upon the weight of dry cement, and wherein the relative proportion of copolymer to sodium salt of naphthalene formaldehyde sulfonate to polyvinylpyrrolidone polymer in the additive blend is approximately 3:3:1;
   pumping said cement slurry to the desired location in said wellbore; and
   allowing said cement slurry to harden to a solid mass.

3. The method of claim 2, wherein the additive blend is present in the range from about 0.6 to 0.7 weight percent, based upon the weight of dry cement.

4. A method of cementing a wellbore, comprising the steps of:
   mixing together a hydraulic cement, from about 35 to 90 weight percent water, and about 0.7 weight percent of a non-retarding fluid loss additive blend which comprises about 0.3 weight percent of a copolymer of acrylamide and 2-acrylamido-2-methylpropane sulfonate, about 0.3 weight percent of the sodium salt of naphthalene formaldehyde sulfonate, and about 0.1 weight percent of polyvinylpyrrolidone polymer, all weight percents being based upon the dry weight of dry cement, thereby producing a pumpable cement slurry which is characterized by a viscosity in the range from about 5–9 Bearden units of viscosity;
   pumping said cement slurry to the desired location in said wellbore; and
   allowing said cement slurry to harden to a solid mass.

* * * * *